US012673353B2

(12) United States Patent
Baba et al.

(10) Patent No.: US 12,673,353 B2
(45) **Date of Patent: \*Jul. 7, 2026**

(54) METHOD FOR DETECTING ABNORMAL VIBRATION OF ROLLING MILL, APPARATUS FOR DETECTING ABNORMALITY OF ROLLING MILL, ROLLING METHOD, AND METHOD FOR PRODUCING METAL STRIP

(71) Applicant: JFE STEEL CORPORATION, Tokyo (JP)

(72) Inventors: Wataru Baba, Tokyo (JP); Masahide Yajima, Tokyo (JP); Takehide Hirata, Tokyo (JP); Yukio Takashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 359 days.

This patent is subject to a terminal disclaimer.

(21) Appl. No.: 18/283,958

(22) PCT Filed: Feb. 4, 2022

(86) PCT No.: PCT/JP2022/004545
§ 371 (c)(1),
(2) Date: Sep. 25, 2023

(87) PCT Pub. No.: WO2022/209295
PCT Pub. Date: Oct. 6, 2022

(65) Prior Publication Data
US 2024/0165685 A1     May 23, 2024

(30) Foreign Application Priority Data
Mar. 31, 2021     (JP) ................................ 2021-060120

(51) Int. Cl.
*B21B 38/00* (2006.01)
*G01H 1/00* (2006.01)

(52) U.S. Cl.
CPC ........... *B21B 38/008* (2013.01); *G01H 1/003* (2013.01)

(58) Field of Classification Search
CPC ...... B21B 38/008; B21B 38/00; G01H 1/003; G01H 1/06; G01H 17/00; G01M 7/00; G01M 99/00; B21C 51/00
See application file for complete search history.

(56) References Cited

U.S. PATENT DOCUMENTS

2016/0082491 A1     3/2016   Sprock

FOREIGN PATENT DOCUMENTS

CN          105436205 A     3/2016
CN          111854930 A     10/2020
(Continued)

OTHER PUBLICATIONS

Apr. 5, 2022 International Search Report issued in International Application No. PCT/JP2022/004545.
(Continued)

*Primary Examiner* — Charles Cai
(74) *Attorney, Agent, or Firm* — Oliff PLC

(57)          ABSTRACT

A method for detecting abnormal vibration of a rolling mill including a collecting step of collecting vibration data of the rolling mill, a frequency analysis step of generating first analysis data by performing frequency analysis of the vibration data, a principal component analysis step of performing principal component analysis on the first analysis data by using reference data specified in advance on the basis of a normal state as a principal component and thereby generating evaluation data, which is a projection of the first analysis data onto the reference data, and an abnormal vibration
(Continued)

APPARATUS FOR DETECTING ABNORMALITY OF ROLLING MILL

10 detection step of extracting an outlier component from the evaluation data and the first analysis data and detecting an abnormality of the rolling mill from the extracted outlier component.

10 Claims, 5 Drawing Sheets

(56) References Cited

FOREIGN PATENT DOCUMENTS

| | | | |
|----|-------------|------|---------|
| CN | 116997425 A | | 11/2023 |
| EP | 4282550 A1 | | 11/2023 |
| JP | S62-9709 A | | 1/1987 |
| JP | H08-108205 A | | 4/1996 |
| JP | H11-117875 A | | 4/1999 |
| JP | 2000-158044 A | | 6/2000 |
| JP | 4018932 B2 | | 12/2007 |
| JP | 2010-180836 A | | 8/2010 |
| JP | 2013-10110 A | | 1/2013 |
| JP | 2013010110 A | * | 1/2013 |
| JP | 2013-111614 A | | 6/2013 |
| JP | 2016-2582 A | | 1/2016 |
| JP | 2016516590 A | | 6/2016 |
| JP | 2016-153138 A | | 8/2016 |
| JP | 2017-194371 A | | 10/2017 |
| JP | 2019-122979 A | | 7/2019 |
| JP | 2020-104133 A | | 7/2020 |
| KR | 20110046649 A | * | 5/2011 ............ G01N 29/14 |
| KR | 20130062186 A | | 6/2013 |
| KR | 20180074188 A | | 7/2018 |

OTHER PUBLICATIONS

Sep. 18, 2025 Office Action issued in Chinese Patent Application No. 202280022690.3 (with concise explanation in English).
Sep. 29, 2025 Office Action issued in Korean Patent Application No. 2023-7031783 (with concise explanation in English).
Liu et al., "Research on Rolling Mill Chatter during Asynchronous Cold Rolling of Thin Strips", China Academic Journal Electronic Publishing House, pp. 48-52, May 1994.
Jun. 11, 2024 Office Action issued in European Patent Application No. 22779524.2.
Jun. 7, 2022 Office Action issued in Japanese Patent Application No. 2022-523332.
Serdio et al., "Fault detection in multi-sensor networks based on multivariate time-series models and orthogonal transformations", Information Fusion 20, pp. 272-291 (Apr. 2014).
Nov. 20, 2025 Office Action issued in U.S. Appl. No. 18/283,994.
Mar. 24, 2026 Office Action issued in European Patent Application No. 22779524.2.

* cited by examiner

APPARATUS FOR DETECTING
ABNORMALITY OF ROLLING MILL

COMPARATIVE EXAMPLES 1 AND 2

— — — CHATTER MARKS DID NOT OCCUR

———— CHATTER MARKS OCCURRED

EXAMPLE 3

— — — CHATTER MARKS DID NOT OCCUR

———— CHATTER MARKS OCCURRED

COMPARATIVE EXAMPLE 3

─ ─ ─ CHATTER MARKS DID NOT OCCUR

───── CHATTER MARKS OCCURRED

Fref3

METHOD FOR DETECTING ABNORMAL VIBRATION OF ROLLING MILL, APPARATUS FOR DETECTING ABNORMALITY OF ROLLING MILL, ROLLING METHOD, AND METHOD FOR PRODUCING METAL STRIP

TECHNICAL FIELD

This application relates to a method for detecting vibration occurring in a rolling mill that rolls a steel sheet into a predetermined thickness. More specifically, the application relates to a method for detecting abnormal vibration of a rolling mill that causes a defect on a surface of a steel sheet, an apparatus for detecting an abnormality, a rolling method, and a method for producing a metal strip.

BACKGROUND

In general, a steel sheet used for an automobile, a beverage can, or the like is subjected to continuous casting, hot rolling, and cold rolling, undergoes an annealing process and a plating process, and is then processed according to an intended purpose. The cold rolling process is a final process that determines a steel sheet thickness of a product. Since a surface of a steel sheet before plating determines a surface of a final product after the plating, it is required to prevent a surface defect in the cold rolling process.

One example of the surface defect occurring in the cold rolling process is chatter marks. The chatter marks are a pattern in which a linear mark in a width direction of a metal strip periodically appears in a longitudinal direction, and is considered to occur mainly because of vibration (chattering) of a rolling mill. Furthermore, it is known that one cause of occurrence of chatter marks is a polygonal deformation phenomenon of a backup roll (see Non Patent Literature 1). Non Patent Literature 1 discloses how chatter marks occur on a steel sheet, specifically, discloses that when a rolling mill satisfies a specific condition, a striped pattern in a width direction similar to chatter marks occur on a backup roll due to self-excited vibration, the marks on the backup roll becomes a new vibration source and causes large vibration, and as a result chatter marks occur on a steel sheet.

Very slight chatter marks are not found by visual check, sheet thickness measurement, and the like performed after rolling and are found for the first time after a plating process. This constitutes a factor that markedly deteriorates productivity. Furthermore, especially in a case of a thin material such as a steel sheet for can or an electrical steel sheet, it is known that a rapid fluctuation in sheet thickness or tension caused by chattering causes a phenomenon such as breakage of a sheet and inhibits production.

Conventionally, various chattering detection methods have been developed from a perspective of preventing inhibition of productivity and a surface defect (see, for example, Patent Literatures 1 to 3). Patent Literature 1 describes a method of measuring vibration by a vibration detector attached to a rolling mill, performing frequency analysis of the obtained vibration and rolling parameters, and determining chattering on the basis of a signal intensity of a frequency that can occur for each vibration occurrence factor.

In Patent Literatures 2 and 3, a vibration detector is disposed not only on a rolling mill body, but also on rolls (small-diameter rolls) that are disposed between stands and on entry and exit sides of a cold rolling mill and around which a metal sheet is wound to a certain angle or more. In the disclosed method, frequency analysis is performed on vibration values obtained by the vibration detector, and it is determined that abnormal vibration has occurred in a case where a frequency that matches a frequency of string vibration of a steel sheet exceeds a threshold value.

CITATION LIST

Patent Literature

PTL 1: Japanese Unexamined Patent Application Publication No. 08-108205
PTL 2: Japanese Unexamined Patent Application Publication No. 2016-153138
PTL 3: Japanese Unexamined Patent Application Publication No. 2016-2582

Non Patent Literature

NPL 1: Ryu Takahiro et al. "Polygonal Deformation Phenomena of Backup Rolls of Steel Making Machine" the Japan Society of Mechanical Engineers [No. 01-5] Dynamics and Design Conference 2001 CD-ROM collection of papers [2001.8.6.6-9, Tokyo]

SUMMARY

Technical Problem

In a case where vibration caused by chatter marks on a backup roll can be detected early as in Non Patent Literature 1, occurrence of chatter marks on a metal strip can be suppressed. However, in the case of Patent Literature 1, noise generated from equipment around a rolling mill and vibration generated from a vibration source disposed in a rolling mill body are also detected, and therefore erroneous detection occurs. In the case of Patent Literatures 2 and 3, occurrence of vibration caused by string vibration can be suppressed, but it is difficult to detect vibration generated from other vibration sources. Especially in a continuous cold rolling mill (tandem rolling mill), a metal strip line speed (rolling speed) varies from one stand to another. Accordingly, a rotation speed of work rolls varies from one stand to another, and vibrations of plural frequencies are superimposed. This causes a problem that it is more difficult to detect chattering.

The disclosed embodiments were accomplished in view of the above problem, and an object of the disclosed embodiments is to provide a rolling mill abnormal vibration detection method, an abnormality detection apparatus, a rolling method, and a metal strip producing method that make it possible to detect abnormal vibration that causes chatter marks with high accuracy.

Solution to Problem

[1] A method for detecting abnormal vibration of a rolling mill that has a pair of work rolls and a plurality of backup rolls that support the work rolls, the method including: a collecting step of collecting vibration data of the rolling mill; a frequency analysis step of generating first analysis data by performing frequency analysis of the vibration data; a principal component analysis step of performing principal component analysis on the first analysis data by using reference data specified in advance on the basis of a normal state as a principal component and thereby generating evaluation data, which is projection of the first analysis data onto the reference data; and an abnormal vibration detection step of extracting an outlier component from the evaluation data and the first analysis data and detecting an abnormality of the rolling mill from the extracted outlier component.

[2] The method according to [1], in which in the principal component analysis step, the principal component extracted as the reference data is set for each rolling speed in the rolling mill.

[3] The method according to [1], in which the frequency analysis step generates vibration intensities at respective frequencies as the first analysis data; the method further includes a data conversion step of converting the first analysis data into second analysis data indicative of vibration intensities at respective intervals on a basis of a rolling speed; and the principal component analysis step performs principal component analysis of the second analysis data.

[4] The method according to any one of [1] to [3], in which a plurality of principal components extracted as the reference data in the principal component analysis step are set so that a cumulative value of contribution ratios of the principal components becomes equal to or larger than a reference contribution ratio when principal component analysis is performed on normal analysis data acquired during rolling performed by the rolling mill in a normal state.

[5] The method according to any one of [1] to [4], in which the rolling mill cold-rolls a metal strip.

[6] An apparatus for detecting an abnormality of a rolling mill that has a pair of work rolls and a plurality of backup rolls that support the work rolls, the apparatus including: a data collecting unit that collects vibration data of the rolling mill; a frequency analysis unit that generates first analysis data by performing frequency analysis of the vibration data; a principal component analysis unit that performs principal component analysis on the first analysis data by using reference data specified in advance on a basis of a normal state as a principal component and thereby generates evaluation data, which is projection of the first analysis data onto the reference data; and an abnormality detection unit that extracts an outlier component from the evaluation data and the first analysis data and detects an abnormality of the rolling mill from the extracted outlier component.

[7] A rolling method including a backup roll replacement step of, in a case where an abnormality of a rolling mill is detected by using the method according to any one of [1] to [5], replacing the backup rolls of the rolling mill.

[8] A method for producing a metal strip, the method comprising a step of producing a metal strip by using the rolling method according to [7].

Advantageous Effects

According to the disclosed embodiments, abnormal vibration that causes chatter marks on a metal strip is evaluated on the basis of an outlier component of evaluation data generated by principal component analysis. This makes it possible to prevent erroneous detection that occurs due to noise and the like generated from equipment around a rolling mill and detect abnormal vibration that causes chatter marks with high accuracy. As a result, it is possible to operate a rolling mill while preventing or suppressing occurrence of abnormal vibration, prevent or suppress occurrence of a defect on a surface of a metal strip caused by abnormal vibration, and produce a metal strip with good appearance.

DETAILED DESCRIPTION

Figure 1:
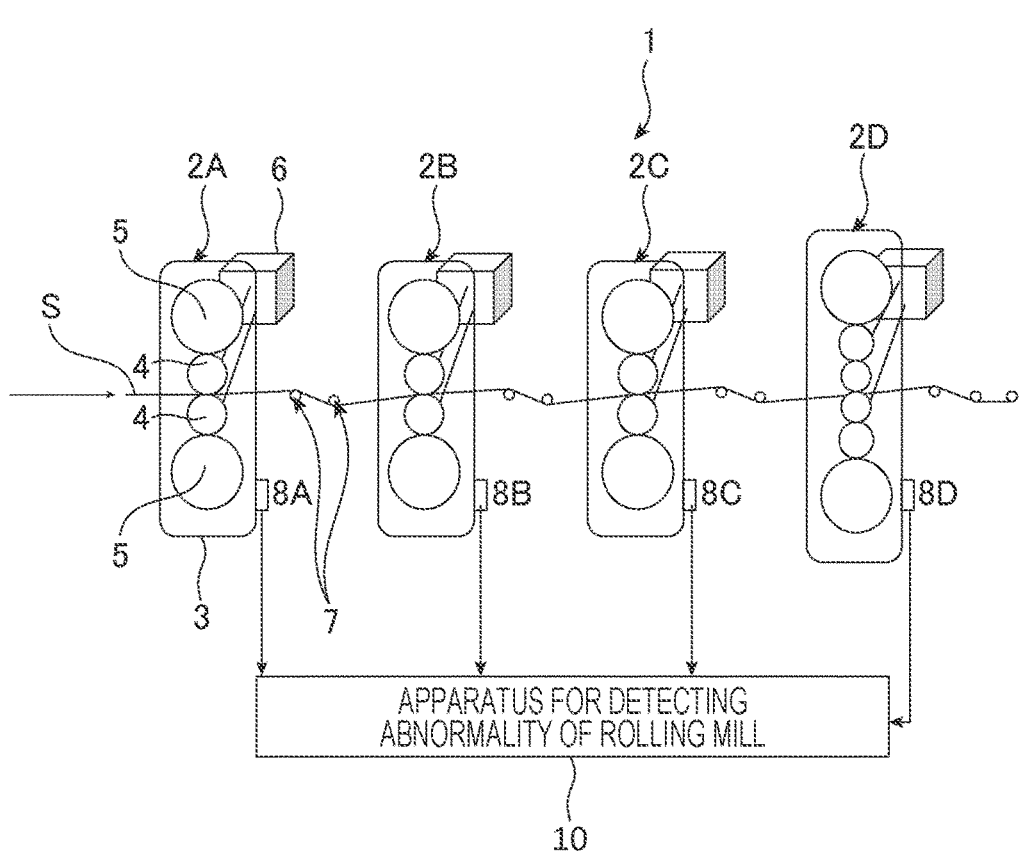
FIG. 1 is a schematic view illustrating an example of rolling equipment to which an apparatus for detecting an abnormality of a rolling mill according to the disclosed embodiments is applied.

A method for detecting abnormal vibration of a rolling mill, an apparatus for detecting an abnormality of a rolling mill, a rolling method, and a method for producing a metal strip according to an embodiment are described below with reference to the drawings. FIG. 1 is a schematic view illustrating an example of rolling equipment to which the apparatus for detecting an abnormality of a rolling mill according to the disclosed embodiments is applied. Rolling equipment 1 of FIG. 1 is, for example, cold rolling equipment that cold-rolls a steel strip that is a metal strip S and includes four rolling mills 2A, 2B, 2C, and 2D (four stands) arranged in a rolling direction. The rolling mills 2A, 2B, 2C, and 2D have an almost identical configuration, and each include a housing 3, a pair of work rolls 4 that are contained in the housing 3 and roll the metal strip S, a plurality of backup rolls 5 that support the work rolls 4, and a driving device 6 that drives the work rolls 4 to rotate. Furthermore, a small-diameter roll 7 on which the rolled metal strip S is suspended is disposed on a downstream side of each of the rolling mills 2A, 2B, 2C, and 2D in the rolling direction.

Vibration meters 8A, 8B, 8C, and 8D are attached to the housings 3 of the rolling mills 2A, 2B, 2C, and 2D, respectively. The vibration meters 8A, 8B, 8C, and 8D measure vibration occurring in the rolling mills 2A, 2B, 2C, and 2D, respectively and comprise, for example, acceleration sensors. Note that positions of the vibration meters 8A, 8B, 8C, and 8D are not limited to the housings 3 and can be any positions where vibration of the rolling mills 2A, 2B, 2C, and 2D can be detected. For example, the vibration meters 8A, 8B, 8C, and 8D may be mounted on roll chocks or the small-diameter rolls 7 on which the rolled metal strip S is suspended.

Specifically, in a case where the vibration meters 8A, 8B, 8C, and 8D are mounted on the small-diameter rolls 7, vibration data acquired by the vibration meters 8A, 8B, 8C, and 8D can be regarded as corresponding to vibration of the rolling mills 2A, 2B, 2C, and 2D disposed on an upstream side relative to the small-diameter rolls 7 on which the vibration meters 8A, 8B, 8C, and 8D are mounted in the rolling direction in which the metal strip S is rolled, respectively. A rolling speed in the present embodiment is a circumferential speed of the work rolls 4 in the rolling mill 2A, 2B, 2C, or 2D or a line speed (exit-side speed) of the metal strip S on an exit side of the rolling mill 2A, 2B, 2C, or 2D. The rolling speed is specified for each of the rolling mills 2A, 2B, 2C, and 2D where the vibration meters 8A, 8B, 8C, and 8D are provided (hereinafter, positions where the vibration meters 8A, 8B, 8C, and 8D are provided are sometimes referred to as stands). In a case where the vibration meters 8A, 8B, 8C, and 8D are mounted on the small-diameter rolls 7, vibration data acquired by the vibration meters 8A, 8B, 8C, and 8D is associated with rolling speeds of the rolling mills 2A, 2B, 2C, and 2D disposed on an upstream side relative to the vibration meters 8A, 8B, 8C, and 8D, respectively. A standard rolling speed in the present embodiment is any rolling speed set for each of the rolling mills 2A, 2B, 2C, and 2D. As the standard rolling speed, a rolling speed empirically recognized as a rolling speed of the rolling mill 2A, 2B, 2C, or 2D at which chattering is likely to occur may be selected. For example, 900 m/min may be selected from a rolling speed range of 800 m/min or higher and 1300 m/min or lower where chattering is likely to occur may be selected as a standard rolling speed for the final stand 2D. In this case, standard rolling speeds for the rolling mills 2A, 2B, and 2C located on an upstream side relative to the final stand 2D may be set on the basis of the standard rolling speed set for the final stand 2D in accordance with a standard pass schedule.

Figure 2:
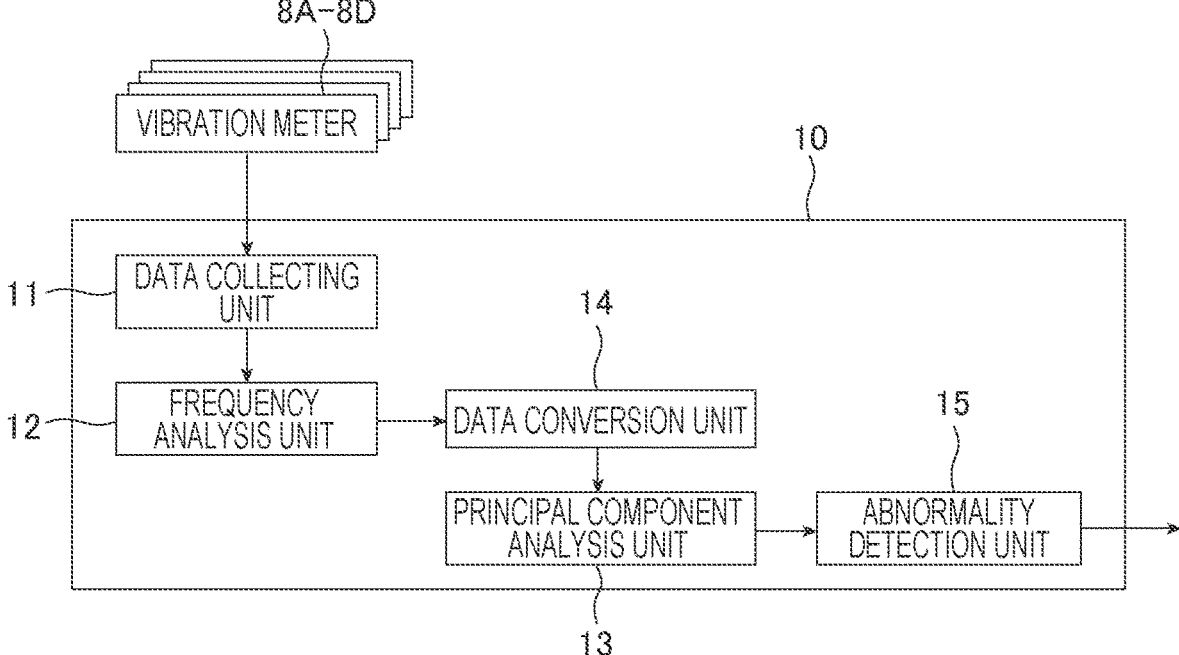
FIG. 2 is a functional block diagram illustrating a preferred embodiment of the apparatus for detecting an abnormality of a rolling mill according to the disclosed embodiments.

FIG. 2 is a functional block diagram illustrating a preferred embodiment of the apparatus for detecting an abnormality of a rolling mill. Note that a configuration of an apparatus 10 for detecting an abnormality of a rolling mill of FIG. 2 is, for example, constructed by a hardware resource such as a computer. The apparatus 10 for detecting an abnormality of a rolling mill detects abnormal vibration of the rolling mills 2A, 2B, 2C, and 2D that cause chatter marks and includes a data collecting unit 11, a frequency analysis unit 12, a principal component analysis unit 13, and an abnormality detection unit 15. Furthermore, the apparatus 10 may include a data conversion unit 14, which will be described later.

The data collecting unit 11 collects vibration data detected by the vibration meters 8A, 8B, 8C, and 8D. In a case where the vibration meters 8A, 8B, 8C, and 8D are acceleration sensors, acceleration data of vibration is sent to the data collecting unit 11 from the vibration meters 8A, 8B, 8C, and 8D. The data collecting unit 11 continuously acquires acceleration data. Then, the data collecting unit 11 converts acceleration data measured within a preset data sampling period (e.g., a period of 0.2 seconds) among the acquired acceleration data into speed data by time integration, and collects the speed data as vibration data at each time, that is, each data sampling period. As a result, the vibration data becomes vibration speeds arranged in time series.

The data collecting unit 11 performs, for example, measurement for a data sampling period of 0.2 seconds and calculation of vibration data in a preset data acquisition cycle (e.g., every 1 second). In the case of a continuous cold rolling mill, the data sampling period is preferably set to 0.1 seconds or longer and 1 second or shorter, and a data acquisition cycle is preferably set to 1 second or longer and 5 seconds or shorter. If the data sampling period is shorter than 0.1 seconds, there is a possibility that data sufficient to identify vibration of a rolling mill cannot be obtained, and if the data sampling period is longer than 1 second, there is a possibility that a calculation load of frequency analysis and the like becomes high, and therefore the data sampling period is set to avoid these possibilities. If the data acquisition cycle is shorter than 1 second, there is a possibility that a calculation load of frequency analysis and the like becomes high, and if the data acquisition cycle is longer than 5 seconds, there is a possibility that it is difficult to detect abnormal vibration early, and therefore the data acquisition cycle is set to avoid these possibilities.

Although a case where the data collecting unit 11 collects vibration data from each of the vibration meters 8A, 8B, 8C, and 8D is illustrated in this example, the data collecting unit 11 may be configured to collect vibration data from any one vibration meter 8D (8A, 8B, or 8C) among the vibration meters 8A, 8B, 8C, and 8D. This is because chattering in the rolling mill (stand) 2D (2A, 2B, or 2C) in which the any one vibration meter 8D (8A, 8B, or 8C) is provided can be detected with certainty on the basis of vibration data collected by the any one vibration meter 8D (8A, 8B, or 8C). Note that the vibration meters 8A, 8B, 8C, and 8D are not limited to acceleration sensors and may be position sensors or speed sensors that can measure vibration instead of acceleration sensors. This is because acceleration data, speed data, and displacement data can be converted into one another by time integration or time differentiation.

The frequency analysis unit 12 performs frequency analysis of vibration data collected within the data sampling period by the data collecting unit 11 and generates, for each data acquisition cycle, analysis data (hereinafter referred to as first analysis data) that includes vibration intensities at respective frequencies. The frequency analysis unit 12 extracts an amplitude and a phase of a vibration speed for each frequency, for example, by Fourier transform and extracts an absolute of an amplitude of a vibration speed at each frequency as a vibration intensity. Note that frequencies after Fourier transform of digital data become discrete values depending on the number of pieces of data subjected to the Fourier transform and a sampling frequency.

In the present embodiment, plural frequencies at which frequency analysis is performed by the frequency analysis unit 12 are set, and these plural frequencies are referred to as reference frequencies. As the number of reference frequencies, any frequencies may be selected from a frequency band that is ½ or less of a sampling frequency of the vibration meters 8A, 8B, 8C, and 8D. The sampling frequency is the number of times of measurement of vibration (e.g., acceleration) by a vibration meter for 1 second and varies depending on specification of the vibration meter used. In the present embodiment, a lowest sampling frequency among sampling frequencies of the plurality of vibration meters 8A, 8B, 8C, and 8D may be used as a representative value. As the reference frequencies, 20 or more and 1600 or less frequencies are preferably selected from a frequency band that is ½ or less of the sampling frequency. If the number of reference frequencies is less than 20, there is a possibility that occurrence of chattering cannot be detected, and if the number of reference frequencies is more than 1600, there is a possibility that a data acquisition cycle needs to be set long so that a calculation load of the frequency analysis unit 12 does not become too high and occurrence of chattering cannot be detected early, and therefore the number of reference frequencies is set to avoid these possibilities. As the reference frequencies, 200 or more and 800 or less frequencies are more preferably selected from a frequency band that is ½ or less of the sampling frequency. For example, assume that the sampling frequency of the vibration meters 8A, 8B, 8C, and 8D is 5120 Hz, the frequency analysis unit 12 sets a reference frequency every 5 Hz (400 reference frequencies in total) in a frequency range of 5 Hz or more and 2000 Hz or less, and analyzes a vibration intensity for each reference frequency. Note that a frequency analysis method used by the frequency analysis unit 12 is not limited to Fourier transform and can be any method that can analyze vibration data into vibration intensities at respective frequencies, and a known frequency analysis method such as wavelet transform or windowed Fourier transform can be used. Even in this case, the reference frequencies may be set by a same method as that described above.

The principal component analysis unit 13 generates evaluation data by performing principal component analysis using reference data indicative of a normal state on the first analysis data generated by the frequency analysis unit 12. The evaluation data is data obtained by projecting observation data (the first analysis data in the present embodiment) onto a space constituted by principal component vectors. That is, the evaluation data is identified by scalar quantities in which the observation data is projected in directions of a plurality of principal component vectors and is constituted by the same number of pieces of scalar quantity information as the number of principal component vectors. In a case where the first analysis data concerning the vibration intensities at respective frequencies generated by the frequency analysis unit 12 is used as it is, the principal component analysis unit 13 generates evaluation data calculated as projection onto first to i-th principal components (reference data) specified in advance by performing principal component analysis on the first analysis data including the vibration intensities at respective frequencies. The principal component vectors (reference data) applied to the principal component analysis will be described later. Note that the "principal component analysis" may mean both analysis of synthesizing a small number of uncorrelated variables called principal components that express overall dispersion the best from a large number of correlated variables and calculation of projection of observation data onto a space constituted by preset principal component vectors, but the principal component analysis performed by the principal component analysis unit 13 according to the present embodiment means the latter. That is, the principal component analysis unit 13 according to the present embodiment has a function of calculating projection (evaluation data) of the first analysis data onto a space constituted by principal component vectors (reference data) indicative of a preset normal state.

The first to i-th principal components (reference data) used for the principal component analysis performed by the principal component analysis unit 13 are set on the basis of vibration intensities at respective frequencies (reference vibration data) obtained during a normal time where abnormal vibration is not occurring in the rolling mills 2A, 2B, 2C, and 2D. That is, the reference vibration data indicative of vibration intensities at respective reference frequencies is generated every data acquisition cycle by performing frequency analysis on vibration data collected by the data collecting unit 11 during a normal time by the frequency analysis unit 12. A principal component deriving unit 16, which will be described later, generates the reference data by performing principal component analysis on the reference vibration data. Note that the principal component analysis performed by the principal component deriving unit 16 means analysis of synthesizing a small number of uncorrelated principal component vectors that express overall dispersion the best from a large number of correlated variables. The normal time where abnormal vibration is not occurring in the rolling mills 2A, 2B, 2C, and 2D refers to a state where abnormal vibration is not occurring in any of the rolling mills 2A, 2B, 2C, and 2D at a standard rolling speed. Note that the abnormal vibration will be described later.

The reference vibration data is, for example, based on vibration data measured during rolling within 12 hours from replacement of the backup rolls 5 with new ones. The reference vibration data is sometimes referred to as normal analysis data that is data obtained by analysis of normal vibration behavior that does not cause abnormal vibration. The reference vibration data may be based on vibration data measured during rolling within 24 hours from replacement of the backup rolls 5 with new ones. This is because it is empirically known that it takes at least two days for the backup rolls 5 to wear out to a polygonal shape and abnormal vibration does not occur for about two days after replacement of the backup rolls 5 with new ones. A data sampling period for acquisition of the reference vibration data is preferably set identical to a data sampling period for detection of an abnormality during operation (after elapse of 24 hours from replacement of the backup rolls 5 with new ones). A data acquisition cycle for acquisition of the reference vibration data and a data acquisition cycle for acquisition of vibration data during operation may be different.

The reference vibration data is generated for each data acquisition cycle during a normal time, vibration intensities at respective frequencies acquired within a data sampling period are handled as a single data set, and plural data sets are generated accordingly. Accordingly, the reference vibration data includes a plurality of data sets. The number of data sets included in the reference vibration data is preferably 30,000 or more and 200,000 or less. The first to i-th principal components are determined by principal component analysis for identifying a small number of uncorrelated principal component vectors that express overall dispersion the best from a plurality of correlated pieces of reference vibration data while using the reference frequencies as variables by the principal component deriving unit 16, which will be described later, by using the reference vibration data thus acquired, and the first to i-th principal components are referred to as reference data.

Note that the reference data thus determined that is calculated by using vibration intensities at respective reference frequencies during a normal time is sometimes referred to as first reference data. Specifically, a cumulative value is calculated by accumulating contribution ratios in a descending order of a contribution ratio starting from a first principal component representing a feature quantity of the reference vibration data in a principal component space, and i principal components are selected as the reference data until the calculated cumulative value of contribution ratios (cumulative contribution ratio) reaches a preset value. Hereinafter, the preset cumulative contribution ratio is referred to as a reference contribution ratio or a set contribution ratio. The reference contribution ratio in the present embodiment can be set to any value that is equal to or less than 1 (100%) on the basis of a past result of occurrence of chatter marks. In the case of a typical tandem rolling mill, the reference contribution ratio is preferably set as 0.4 (40%) or more and 0.7 (70%) or less, more preferably 0.6 (60%) or more and 0.7 (70%) or less. The reference contribution ratio is an index that influences a degree of reproduction (reproducibility) of vibration behavior of the reference vibration data on a principal component space. If the reference contribution ratio is too high, measurement noise and the like included in the reference vibration data are also reproduced on the principal component space although the vibration behavior of the reference vibration data can be reproduced accurately on the principal component space. On the other hand, if the reference contribution ratio is too low, a feature concerning the vibration behavior of the reference vibration data tends to be lost on the principal component space although influence of measurement noise included in the reference vibration data can be excluded. A suitable range of the reference contribution ratio depends on a rolling mill used and a steel sheet rolling condition, but is preferably set to the above range for the purpose of detecting abnormal vibration of a tandem rolling mill.

Figure 8:
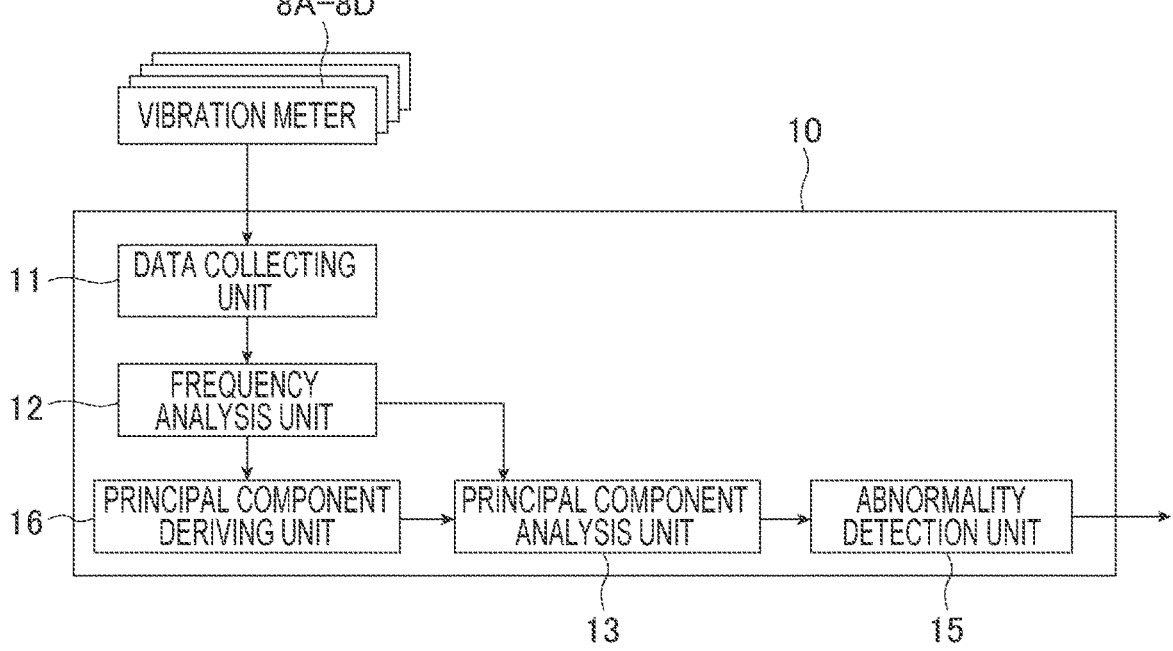
FIG. 8 is a functional block diagram illustrating another preferred embodiment of the apparatus for detecting an abnormality of a rolling mill according to the disclosed embodiments.

To derive the reference data, the apparatus 10 may include the principal component deriving unit 16 that derives a principal component by using the reference vibration data (normal analysis data) generated by the frequency analysis unit 12, as illustrated in FIG. 8. The principal component deriving unit 16 performs analysis of identifying a small number of uncorrelated principal component vectors that expresses overall dispersion the best from a plurality of correlated pieces of reference vibration data. The first to i-th principal components obtained by the principal component deriving unit 16 may be sent to the principal component analysis unit 13, and the principal component analysis unit 13 may calculate projection (evaluation data) of the analysis data (specifically, the first analysis data or second analysis data, which will be described later) acquired during operation onto the first to i-th principal components. Furthermore, in a case where a frequency at which chatter marks are likely to occur in the rolling mills 2A, 2B, 2C, and 2D is known in advance, plural frequencies similar to the frequency may be selected in advance and the number of variables used for the principal component analysis by the principal component analysis unit 13 may be decreased when the principal component deriving unit 16 derives a principal component.

The abnormality detection unit 15 determines whether or not abnormal vibration is occurring on the basis of the evaluation data generated by the principal component analysis unit 13. Specifically, the abnormality detection unit 15 calculates a difference between analysis data (specifically, the first analysis data or the second analysis data, which will be described later) and projection (evaluation data) of the analysis data generated by the principal component analysis unit 13 onto the first to i-th principal components, and specifies the difference as an outlier component. Since the reference data is data representing a feature quantity of vibration data during a normal time, abnormal vibration appears in a direction deviated from the reference data. It can be determined whether or not abnormal vibration is occurring can be determined by monitoring an outlier component, which is a degree of deviation of analysis data acquired during operation by the principal component analysis unit 13 from the reference data (the first to i-th principal components). The outlier component is sometimes called a Q statistic. Furthermore, the abnormality detection unit 15 has a threshold value for determining whether or not abnormal vibration is occurring on the basis of the outlier component, and determines that abnormal vibration is occurring in a case where the outlier component is equal to or larger than the threshold value. The threshold value used in the abnormality detection unit 15 can be set on the basis of a past operation record, specifically, on the basis of actual values of vibration intensities obtained under a condition where no chatter mark occurs.

The principal component analysis unit 13 performs principal component analysis on the first analysis data indicative of vibration intensities at respective frequencies. Abnormal vibration is often vibration that occurs at an interval of one rotation of a rotary member, which will be described later, and chatter marks sometimes occur due to abnormal vibration resulting from rotation of the backup rolls 5. A frequency of abnormal vibration corresponding to rotary motion of a device that constitutes the rolling mills 2A, 2B, 2C, and 2D changes depending on a rolling speed. Therefore, the principal component analysis unit 13 preferably calculates projection of analysis data extracted as evaluation data for each rolling speed onto the first to i-th principal components. Furthermore, it is preferable that reference vibration data is acquired for each rolling speed during a normal state where abnormal vibration is not occurring in the rolling mills 2A, 2B, 2C, and 2D and reference data is generated for each rolling speed by the principal component deriving unit 16. This makes it easier for the abnormality detection unit 15 to clearly distinguish a normal time and an abnormal time at each rolling speed, thereby improving accuracy of abnormal detection. As for division of the evaluation data, it is preferable to divide rolling speeds into approximately 5 stages or more and 20 stages or less on the basis of a highest speed of the rolling mills 2A, 2B, 2C, and 2D and generate the evaluation data for each of the rolling speed ranges.

It is preferable to evaluate occurrence of an abnormality by using an identical index even if a rolling speed varies. In view of this, the apparatus 10 may further include the data conversion unit 14 that performs data conversion of converting the first analysis data into vibration intensities at respective intervals (second analysis data) by converting frequencies into intervals on the basis of a rolling speed. The data conversion unit 14 converts the first analysis data indicative of vibration intensities corresponding to reference frequencies into second analysis data indicative of vibration intensities at respective intervals for each of the rolling mills 2A, 2B, 2C, and 2D in which the vibration meters 8A, 8B, 8C, and 8D are provided (data conversion step). An interval in the present embodiment is an index that is associated with a frequency of vibration and corresponds to a distance of the metal strip S in the longitudinal direction or a circumferential distance of the work rolls 4 of the rolling mills 2A, 2B, 2C, and 2D. That is, the interval is an interval between vibration peaks that become adjacent to each other in the longitudinal direction of the metal strip S or the circumferential direction of the work rolls 4 as a result of the data transform by the data conversion unit 14. Specifically, an interval P (mm) is expressed by the following formula by using a rolling speed V (m/min) and a frequency f (Hz) of vibration.

$$P=(1000 \times V)/(f \times 60) \tag{1}$$

In the data conversion unit 14, standard intervals are stored as intervals corresponding to the standard rolling speed. The standard intervals are intervals calculated from the above formula (1) by using the reference frequencies f of the frequency analysis performed by the frequency analysis unit 12 and the standard rolling speed V. The standard intervals thus set are a plurality of discrete numerical values corresponding to the reference frequencies. The standard intervals are used in the present embodiment for the following reason. Specifically, a rolling speed at which a metal strip S is rolled by the rolling mills 2A, 2B, 2C, and 2D is not necessarily be constant, and even when a single metal strip S is rolled, a rolling speed changes within the metal strip S. Therefore, even vibration occurring at an identical interval is measured as vibration of a different frequency if a rolling speed is different. In this case, in a case where vibrations of a plurality of frequency bands are superimposed, it cannot be clearly understood whether or not a cause of vibration is identical in a case where a rolling speed changes. In view of this, the standard intervals are set in order to evaluate a vibration phenomenon generated from an identical vibration source and observed at a frequency that varies depending on a rolling speed by using a unified index. That is, vibration behavior in which a vibration source that generates vibration at a constant interval is observed as vibration of a different frequency because of a different rolling speed is converted into vibration behavior corresponding to the standard rolling speed, and this is expressed as vibration intensities at respective intervals. In this way, a vibration intensity at any rolling speed acquired during actual operation can be evaluated by using a constant index, that is, a vibration intensity corresponding to a standard interval.

The data conversion unit 14 converts vibration intensities at respective reference frequencies (the first analysis data) into vibration intensities at respective standard intervals (the second analysis data) by using a rolling speed during operation by performing data interpolation such as interpolation or extrapolation. In this case, linear interpolation can be used as the interpolation, and a DC component that is "0" frequency component is interpolated as "0". Furthermore, all frequencies to be extrapolated are handled as "0". In this way, even in a case where a rolling speed varies from one metal strip to another, a frequency at which an abnormality is occurring can be evaluated by using a constant index, that is, a standard interval. Note that in the following description, the term "interval" is used to mean a "standard interval" associated with a reference frequency and a standard rolling speed from a perspective of determining an abnormality of vibration corresponding to a specific interval. That is, the term "interval" means the same as the term "standard interval" unless otherwise specified.

The following describes vibration measured by the vibration meters 8A, 8B, 8C, and 8D provided in the rolling mills 2A, 2B, 2C, and 2D. As vibration measured by the vibration meters 8A, 8B, 8C, and 8D, vibration resulting from rotation of the work rolls 4 and the like and vibration that occurs in a natural period of the rolling mills 2A, 2B, 2C, and 2D are superimposed. The former vibration varies depending on a rolling speed, and the latter vibration is measured as vibration that does not depend on a rolling speed. Therefore, as for the vibration resulting from rotation of the work rolls 4 and the like, when a rolling speed changes, a frequency of vibration measured by the vibration meters 8A, 8B, 8C, and 8D changes. On the other hand, as for a vibration intensity of vibration that occurs in a natural period of the rolling mills 2A, 2B, 2C, and 2D, a magnitude (amplitude) of the vibration intensity often changes although a frequency of the vibration does not change much. Due to such characteristics of vibration of a rolling mill, according to the method of focusing on a specific frequency and detecting abnormal vibration of a rolling mill on the basis of a vibration intensity at this frequency, it is sometimes difficult to detect an abnormality related to rotators such as the work rolls 4, the backup rolls 5, and shaft bearing parts thereof in the rolling mills 2A, 2B, 2C, and 2D although an abnormality corresponding to vibration that occurs in a natural period of the rolling mills 2A, 2B, 2C, and 2D can be detected. On the other hand, according to the present embodiment, even in a case where a rolling speed changes, it is easy to detect an abnormality of a vibration system resulting from rotation occurring at a specific interval because of conversion into vibration intensities at respective standard intervals.

Figure 9:
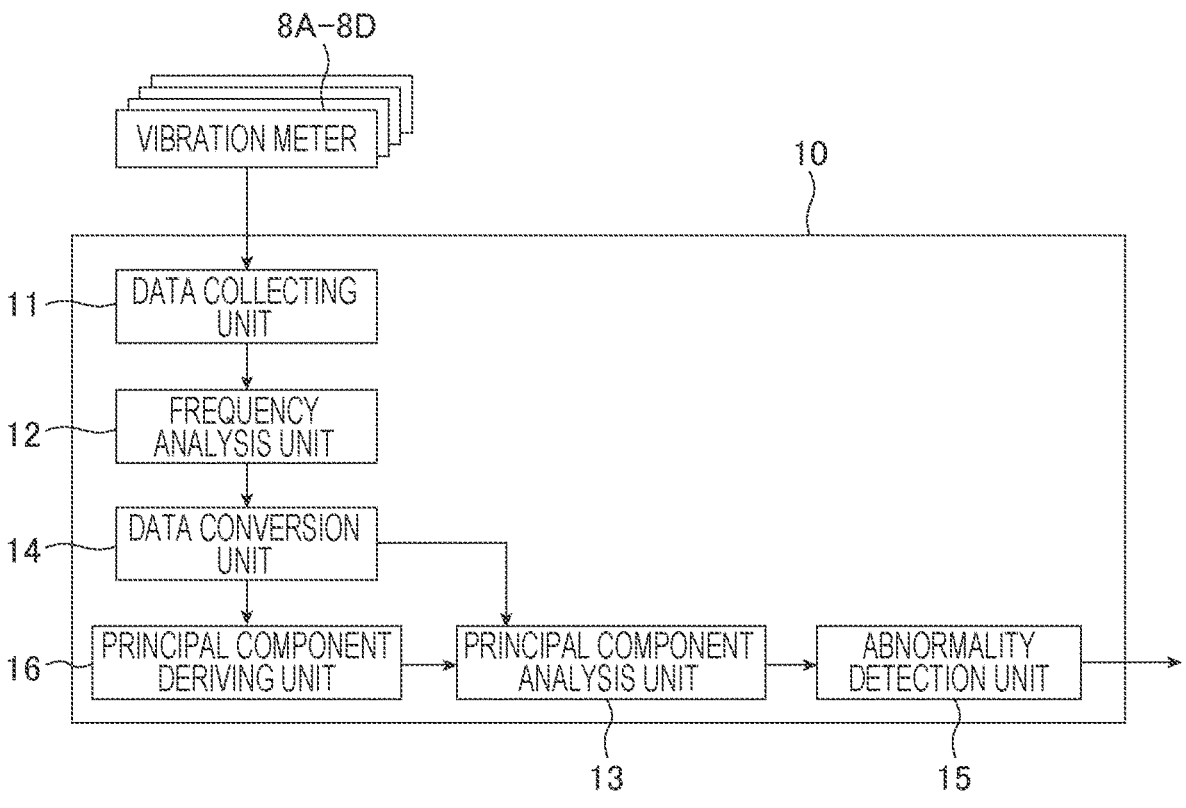
FIG. 9 is a functional block diagram illustrating still another preferred embodiment of the apparatus for detecting an abnormality of a rolling mill according to the disclosed embodiments.

FIG. 9 illustrates an embodiment in which the apparatus 10 includes both of the data conversion unit 14 and the principal component deriving unit 16. The first analysis data representing a relationship between frequencies and vibration intensities that is generated by the frequency analysis unit 12 is converted into the second analysis data including intervals and the vibration intensities by using the above formula (1) by the data conversion unit 14. The principal component deriving unit 16 illustrated in FIG. 9 performs analysis of synthesizing a small number of uncorrelated principal component vectors that express overall dispersion the best from a large number of correlated variables by using a plurality of pieces of second reference vibration data including intervals and vibration intensities that is generated from vibration intensities at respective frequencies (reference vibration data) during a normal time by the data conversion unit 14. The principal component deriving unit 16 illustrated in FIG. 9 calculates, as reference data, first to i-th principal components specified as a small number of uncorrelated principal component vectors that express overall dispersion the best from a plurality of correlated pieces of second reference vibration data while using intervals as variables. Hereinafter, the reference data calculated on the basis of the second reference vibration data is referred to as second reference data. The second reference data obtained by the principal component deriving unit 16 illustrated in FIG. 9 may be sent to the principal component analysis unit 13, and the principal component analysis unit 13 may calculate projection (evaluation data) of second analysis data acquired during operation onto the first to i-th principal components. Hereinafter, evaluation data calculated as projection of the second analysis data onto the second reference data is referred to as second evaluation data.

Then, the principal component analysis unit 13 generates, as the second evaluation data, projection of second analysis data during operation onto the second reference data from the second reference data (the first to i-th principal components) acquired from the principal component deriving unit 16 and the second analysis data representing a relationship between intervals and vibration intensities acquired from the data conversion unit 14. Then, the abnormality detection unit 15 calculates a difference (outlier component) between the second analysis data including vibration intensities at respective intervals and the second evaluation data generated by the principal component analysis unit 13, and determines that abnormal vibration is occurring in a case where the calculated outlier component is equal to or larger than a preset threshold value.

Operation of the method for detecting abnormal vibration of a rolling mill and the apparatus 10 for detecting an abnormality of a rolling mill according to the disclosed embodiments is described with reference to FIGS. 1 and 2. During cold rolling of the metal strip S, that is, during operation of the rolling equipment 1, vibration data of the rolling mills 2A, 2B, 2C, and 2D is measured by the vibration meters 8A, 8B, 8C, and 8D and is collected by the data collecting unit 11 (collecting step). In the collecting step, data is collected for a data sampling period in each data acquisition cycle. In a case where acceleration sensors are used as the vibration meters 8A, 8B, 8C, and 8D, time-series data of accelerations acquired by the vibration meters 8A, 8B, 8C, and 8D is converted into vibration data of vibration speeds. The collected vibration data is subjected to frequency analysis by the frequency analysis unit 12, and thus first analysis data is generated (frequency analysis step). The frequency analysis unit 12 generates the first analysis data indicative of a relationship between frequencies and vibration intensities in each data acquisition cycle. Note, however, that in a case where the data conversion unit 14 is provided, the first analysis data is converted into second analysis data indicative of a relationship between intervals and vibration intensities by the data conversion unit 14.

The first analysis data is subjected to principal component analysis by the principal component analysis unit 13, and evaluation data is generated as projection onto reference data (first reference data) derived in advance (principal component analysis step). The principal component analysis performed by the principal component analysis unit 13 is for calculating projection of the first analysis data onto a space constituted by preset principal component vectors. Then, a difference (an outlier component) between the first analysis data including vibration intensities at respective frequencies and projection of the first analysis data onto the first to i-th principal components (the first reference data), that is, evaluation data is calculated by the abnormality detection unit 15, and in a case where the outlier component is equal to or larger than a preset threshold value, occurrence of abnormal vibration in the rolling mills 2A, 2B, 2C, and 2D is detected (abnormal vibration detection step).

In a case where the data conversion unit 14 is provided, the second analysis data is generated in the data conversion unit 14 and is sent to the principal component analysis unit 13. In this case, in the principal component analysis step, the second analysis data is subjected to principal component analysis by the principal component analysis unit 13, and second evaluation data is generated as projection onto reference data (second reference data) derived in advance. The principal component analysis performed by the principal component analysis unit 13 is for calculating projection of the second analysis data onto a space constituted by principal component vectors that are the second reference data. Then, in the abnormal vibration detection step, a difference (outlier component) between the second analysis data including vibration intensities at respective intervals and projection of the second analysis data onto the first to i-th principal components (the second reference data), that is, the second evaluation data is calculated by the abnormality detection unit 15, and in a case where the outlier component is equal to or larger than a preset threshold value, occurrence of abnormal vibration in the rolling mills 2A, 2B, 2C, and 2D is detected.

According to the above embodiment, abnormal vibration of the rolling mills 2A, 2B, 2C, and 2D that causes chatter marks can be detected with high accuracy. That is, by thus identifying, as principal components representing a feature quantity of reference vibration data during a normal time, a vibration component that naturally occurs due to a property unique to equipment such as engagement of gears of the rolling mills 2A, 2B, 2C, and 2D and a vibration characteristic of bearings of the rolling mills 2A, 2B, 2C, and 2D, analysis that emphasizes only abnormal vibration can be performed.

Abnormal vibration of the rolling mills 2A, 2B, 2C, and 2D often results from natural vibration of the rolling mills 2A, 2B, 2C, and 2D or vibration resulting from rotation of a device caused by a defective bearing, engagement of gears, defective coupling, backlash, or the like. Therefore, conventional abnormal vibration detection is performed on the basis of whether or not an amplitude of a specific frequency exceeds a certain threshold value. On the other hand, in a case where chatter marks occur, minute vibration occurs at a frequency corresponding to an interval of the chatter marks before occurrence of the chatter marks, and the vibration gradually increases with passage of time. That is, minute vibration resulting from equipment occurs first, and then chatter marks occur on a surface of the metal strip S. However, during actual operation, a steady-state rolling speed changes from one metal strip S to another. Therefore, just by focusing on a preset specific frequency, it is difficult to detect minute vibration that has not reached abnormal vibration yet. On the other hand, in the present embodiment, a frequency or an interval at which a vibration intensity increases can be recognized during operation, and therefore occurrence of abnormal vibration in any frequency band can be detected early. As a result, it is possible to operate a rolling mill while preventing or suppressing occurrence of abnormal vibration, prevent or suppress occurrence of a defect on a surface of a metal strip caused by abnormal vibration, and produce a metal strip with good appearance.

Furthermore, as a result of examination of a vibration source of abnormal vibration that causes chatter marks, it has been found that minute marks of an identical interval to chatter marks sometimes occur on a surface of an upper or lower one of the backup rolls 5 (for example, the backup roll 5 is sometimes worn out into a polygonal shape) when the chatter marks occur. Then, the minute marks on the backup roll 5 cause resonance with the rolling mills 2A, 2B, 2C, and 2D at a predetermined rolling speed and gradually becomes clearer, and concurrently abnormal vibration of the rolling mills 2A, 2B, 2C, and 2D becomes larger.

The interval of the minute marks of the backup roll 5 does not change depending on a rolling speed. The minute marks of the backup roll 5 are unobservable before incorporation into the rolling mills 2A, 2B, 2C, and 2D, and a wavelength (interval) or a frequency of chatter marks cannot be predicted. The vibration data includes vibration caused by many other factors that cause vibration of a constant wavelength such as a meshing frequency of bearings or gears, and therefore a clear vibration peak of chatter marks is not obtained from the start.

In view of this, a relationship between frequencies or standard intervals and vibration intensities at the time is found by frequency analysis of the vibration data, and abnormal vibration is detected by distinguishing a vibration peak of chatter marks from other vibration factors by using a principal component analysis method. This makes it possible to accurately detect abnormal vibration of the rolling mills 2A, 2B, 2C, and 2D that cause chatter marks.

Furthermore, in a case where abnormal vibration is detected by the method for detecting abnormal vibration of the rolling mills 2A, 2B, 2C, and 2D, a rotary member that causes the abnormal vibration of a rolling mill such as the backup rolls 5 of the rolling mills 2A, 2B, 2C, and 2D may be replaced (backup roll replacement step). This makes it possible to realize rolling operation in which abnormal vibration occurring at any frequency or interval even in a case where a plurality of metal strips S are rolled for a long term. By such rolling, it is possible to prevent or suppress occurrence of chatter marks on a surface of the metal strip S and thereby produce the metal strip S with good appearance. In a case where it is empirically known that abnormal vibration occurs at a specific frequency or interval, it is only necessary to acquire past result data of an outlier component at the specific frequency or interval in advance and set an outlier component threshold value that can satisfy a shipment standard of the metal strip S as a product on the basis of the past result data. In a case where abnormal vibration is detected by using the set outlier component threshold value by the abnormality detection unit 15, operation of the rolling equipment 1 may be stopped once, and a rotary member that causes abnormal vibration of a rolling mill such as the backup rolls 5 of the rolling mill 2A, 2B, 2C, or 2D in which the abnormal vibration has occurred may be replaced. This makes it possible to realize rolling operation in which occurrence of abnormal vibration at a specific frequency or interval is prevented even in a case where a plurality of metal strips S are rolled for a long term.

EXAMPLES

Example 1

Example 1 performed to confirm the operation and effects of the disclosed embodiments is described below. Rolling equipment (a tandem rolling mill) with four stands was used, and a vibration meter was attached to a housing of each visually checking chatter marks of an interval of a vibration frequency. In the grinding test, the alloyed hot-dip galvannealed steel sheet was manually polished in the rolling direction while pressing a grindstone against the alloyed hot-dip galvannealed steel sheet by light pressing force of approximately 10 N or less, and whether or not a striped pattern in the travelling direction of the steel sheet was visible as chatter marks was evaluated. Note that it was confirmed from a pattern (minute marks) remaining on the backup rolls 5 of a final stand (fourth stand) that a rolling mill in which chatter marks occurred was the fourth stand in each example. Table 1 illustrates a result of the evaluation.

TABLE 1

| | Chatter mark determination using vibration intensity (○: did not occur, x: occurred) | Visual chatter mark determination (○: did not occur, x: occurred) | Result (○: matched, x: did not matched) |
|---|---|---|---|
| Comparative Example 1 (vibration intensity threshold value determination) | ○ | x (530 Hz) | x |
| Comparative Example 2 (vibration intensity threshold value determination) | x (405 Hz and other frequencies) | ○ | x |
| Example 1 (outlier component threshold value determination) | x (190 Hz, 515 Hz) | x (515 Hz) | ○ |
| Example 2 (outlier component threshold value determination) | x (28.8 mm) | x (approximately 29 mm) | ○ | stand. A sampling frequency was set to 4000 Hz, and a reference frequency was set every 5 Hz in a frequency range of 0 Hz to 2000 Hz. The data collecting unit 11 acquired intensities of vibration speeds in each data acquisition cycle on conditions that a data sampling period was 0.2 sec and the data acquisition cycle was 1 sec and outputted the acquired intensities of the vibration speeds to the frequency analysis unit 12. A metal strip (hereinafter referred to as a steel sheet) made of low-carbon steel was used as a sample material, and this steel sheet was prepared for each of Examples 1 and 2 and Comparative Examples 1 and 2 of Example 1. A thickness on an entry side of the rolling equipment was set to 2.0 mm or more and 5.5 mm or less, a thickness on an exit side of the rolling equipment was set to 0.5 mm or more and 2.4 mm or less, and a steel sheet width was set to 700 mm or more and 1700 mm or less in a rolling direction (travelling direction) in which the steel sheet was rolled.

Vibration data during rolling of this steel sheet was collected, and vibration data at a timing of occurrence of chatter marks was extracted from a storage device in which the collected vibration data was stored. Whether or not chatter marks occurred was determined by determination using a vibration intensity of a rolling mill, that is, a method including the present example, by a method for determining whether or not abnormal vibration occurred on the basis of an output of a vibration meter provided in the rolling mill and by a determination method of performing a grinding test on an alloyed galvannealed steel sheet after rolling and In Table 1, in the "chatter mark determination using vibration intensity" column, "x" was entered in a case where it was determined as a result of determination using a vibration intensity of a rolling mill that abnormal vibration occurred in the rolling mill, and "○" was entered in a case where it was determined that abnormal vibration did not occur in the rolling mill. On the other hand, in the "visual chatter mark determination" column, "x" was entered in a case where chatter marks were visually found on a surface of the hot-dip galvanized steel sheet after grinding, and "○" was entered in a case where it was visually determined that chatter marks did not occur. In this case, since chatter marks are an abnormality in quality of a steel sheet, detection of chatter marks means occurrence of abnormal vibration in a rolling mill. In the "chatter mark determination using vibration intensity" column, a vibration frequency or an interval was entered in a parenthesis in a case where chatter marks were detected.

As the vibration frequency entered in a case where chatter marks were detected, a frequency at which a vibration intensity exceeded a preset threshold value was entered. As the interval entered in a case where chatter marks were detected, an interval at which an outlier component exceeded a preset threshold value in the abnormality detection unit 15 was entered. Similarly, in the "visual chatter mark determination" column, a vibration frequency or an interval was entered in a parenthesis in a case where chatter marks were found. As the interval entered in a case where chatter marks were found, an interval of a striped pattern that was visually observed was entered. As the frequency entered in a case where chatter marks were found, a result of converting an interval of a striped pattern that was visually measured into a frequency of abnormal vibration by using a past result value of a rolling speed during passage of a corresponding portion of the steel sheet, that is, the chatter marks through the final stand (fourth stand) where the chatter marks occurred was entered.

In Example 1 of Table 1, a vibration meter was mounted on a housing of the final stand (fourth stand), first analysis data was generated by the frequency analysis unit 12, and then evaluation data was calculated by using the first reference data as variables by principal component analysis in the principal component analysis unit 13. Furthermore, the abnormality detection unit 15 calculated an outlier component, which was a difference of the first analysis data from the evaluation data, and then determined for an outlier component at each frequency whether or not chatter marks occurred on the basis of a preset threshold value. The principal components (the first reference data) were calculated by performing principal component analysis of synthesizing a small number of uncorrelated principal component vectors that express overall dispersion the best from a large number of correlated variables on reference vibration data calculated from vibration data for one day measured during a normal time after elapse of approximately two days from replacement of the backup rolls 5 by using the principal component deriving unit 16. Note that as the principal component vectors, ten principal components were selected in a descending order of a contribution ratio.

On the other hand, Example 2 of Table 1 is an example in which the apparatus 10 including both of the data conversion unit 14 and the principal component deriving unit 16 illustrated in FIG. 9 was used. First, second reference vibration data was generated by converting reference vibration data acquired during a normal time into a relationship between intervals and vibration intensities by the data conversion unit 14. The principal component deriving unit 16 derived second reference data that is a small number of uncorrelated principal component vectors that express overall dispersion the best from the second reference vibration data. Then, second evaluation data for the second reference vibration data was calculated by using the second reference data as variables by principal component analysis performed by the principal component analysis unit 13. The abnormality detection unit 15 calculated a difference of the second analysis data from the second evaluation data as an outlier component and then determined for an outlier component at each interval whether or not chatter marks occurred on the basis of a preset threshold value. Note that also in Example 2, the principal component deriving unit 16 selected ten principal components in a descending order of a contribution ratio, and these principal components were used as the second reference data.

The derivation of principal components (the first reference data and the second reference data) by the principal component deriving unit 16 was performed on reference vibration data obtained from various rolling speeds for each of sections into which rolling speeds were divided every 50 m/min. Example 1 is an example in which principal component analysis using the first reference data was performed on the first analysis data including vibration intensities at respective frequencies, and Example 2 is an example in which principal component analysis using the second reference data was performed on the second analysis data.

On the other hand, Comparative Examples 1 and 2 are examples in which a vibration meter was mounted on the housing of the fourth stand and determination was performed on first analysis data including vibration intensities at respective frequencies output by the frequency analysis unit 12 by using different threshold values without performing principal component analysis. In this case, Comparative Examples 1 and 2 are examples in which determination concerning abnormal vibration was attempted by using different threshold values for first analysis data acquired in a case where chatter marks occurred and first analysis data acquired in a case where chatter marks did not occur at an identical rolling speed. That is, in Comparative Example 1, a threshold value concerning a vibration intensity for determining whether or not abnormal vibration occurred was set to Fref1, and in Comparative Example 2, a threshold value concerning a vibration intensity for determining whether or not abnormal vibration occurred was set to Fref2.

Figure 3:
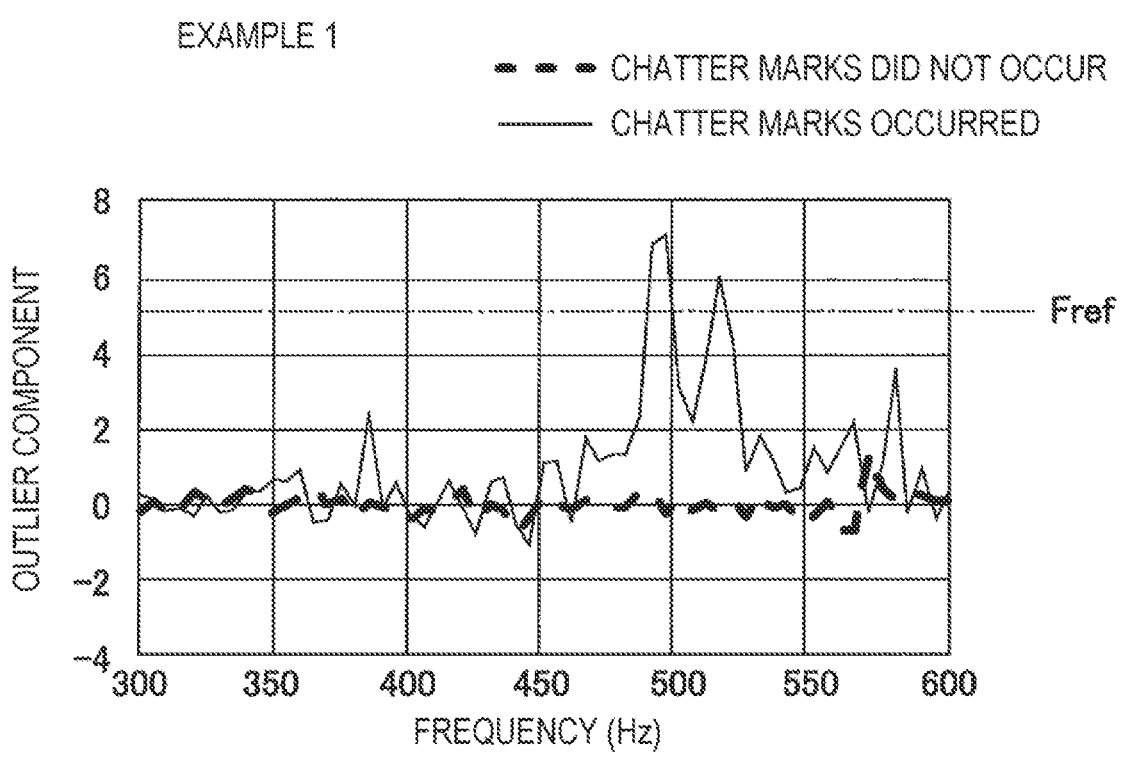
FIG. 3 is a graph of Example 1 illustrating outlier components from principal components at respective frequencies.
Figure 4:
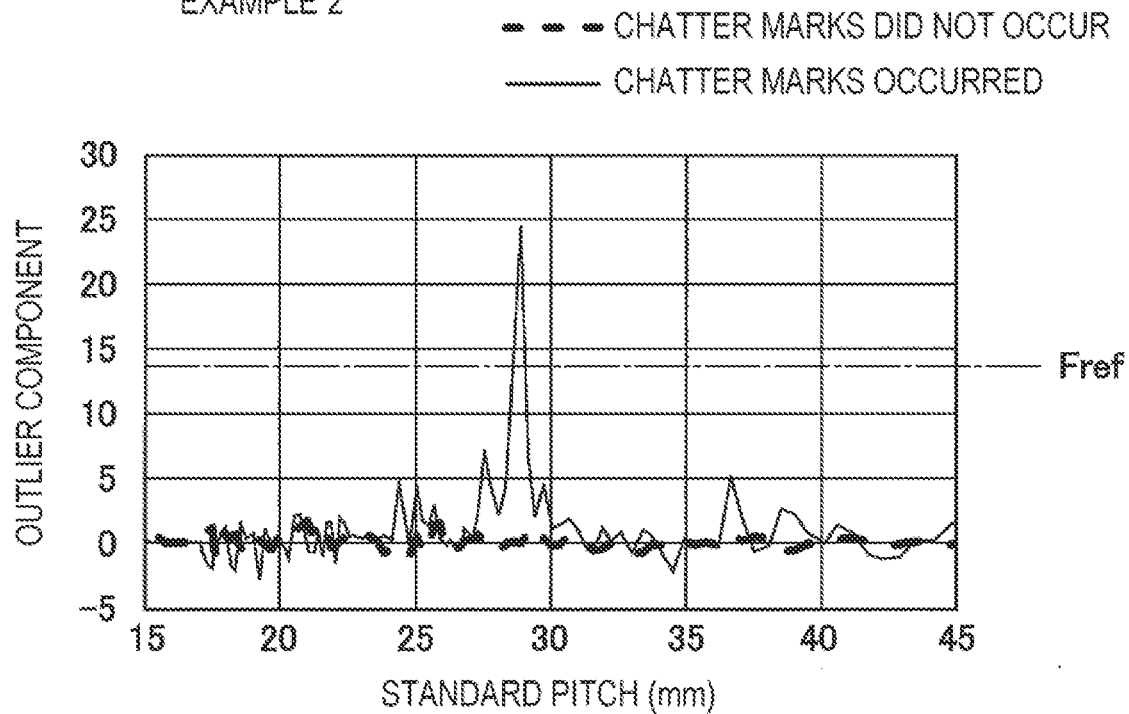
FIG. 4 is a graph of Example 2 illustrating outlier components at respective standard intervals.

FIG. 3 is a graph of Example 1 illustrating outlier components at respective frequencies calculated by the abnormality detection unit 15, and FIG. 4 is a graph of Example 2 illustrating outlier components at respective standard intervals. Note that FIG. 3 illustrates outlier components at a rolling speed of 14 m/sec since a peak position of the outlier components changes as a rolling speed changes. FIG. 4 also illustrates outlier components at the rolling speed of 14 m/sec. As is clear from FIGS. 3 and 4, abnormal vibration that caused chatter marks and normal vibration that did not cause chatter marks were clearly distinguished by calculating projection of analysis data (the first analysis data and the second analysis data) onto principal components (the first reference data and the second reference data) by principal component analysis and calculating outlier components corresponding to the first analysis data and the second analysis data in the abnormality detection unit 15, and whether or not abnormal vibration causing chatter marks occurred could be determined with high accuracy by setting an appropriate threshold value Fref.

Figure 5:
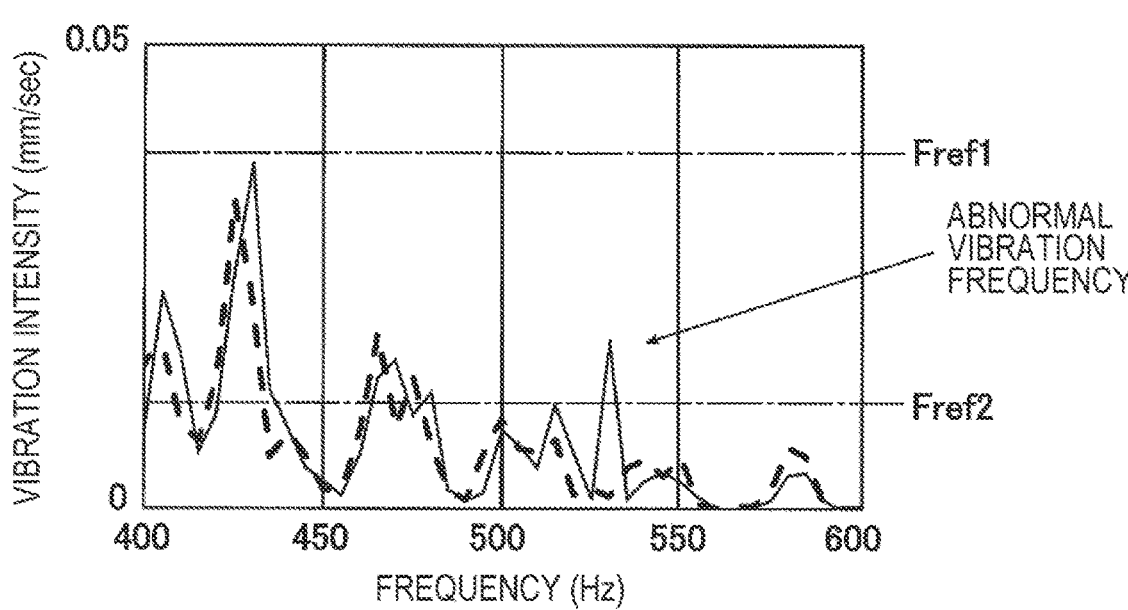
FIG. 5 is a graph illustrating Comparative Examples 1 and 2 using a threshold value for vibration intensities.

FIG. 5 is a graph illustrating Comparative Examples 1 and 2 in which abnormality determination was performed by using first analysis data indicative of vibration intensities at respective frequencies output by the frequency analysis unit 12. Note that FIG. 5 illustrates a frequency analysis result at a rolling speed of 14 m/sec since a peak position of the vibration intensities changes as a rolling speed changes. In Comparative Example 1, even in a case where chatter marks occurred, a vibration intensity of abnormal vibration did not reach the threshold value Fref1, and abnormal vibration could not be detected. On the other hand, in a case where the threshold value Fref2 was used as Comparative Example 2, a vibration intensity of abnormal vibration could be detected, but there was a vibration intensity larger than the threshold value Fref2 even in a case where chatter marks did not occur, that is, even in a case where a frequency of vibration resulting from a factor other than chatter marks occurred, and erroneous detection of abnormal vibration occurred.

This is because various vibrations occurring in the stands of the tandem rolling mill are superimposed in the vibration intensities at respective frequencies and it is therefore difficult to distinguish a case where chatter marks occurred and a case where chatter marks did not occur. Actually, in the vicinity of a frequency 530 Hz, a difference in vibration intensity is observed between a case where chatter marks occurred and a case where chatter marks did not occur. However, in order to detect chatter marks on the basis of the above difference, it is necessary to set a frequency in the vicinity of 530 Hz in advance and set a threshold value corresponding to the frequency band. It is difficult to perform such setting in advance. Actually, it is therefore difficult to detect occurrence of chatter marks with high accuracy. Conventionally, it is necessary to roll a metal strip while changing a threshold value concerning a vibration intensity through trial and error in advance as in Comparative Examples 1 and 2, and failure to detect chatter marks occurred approximately 10 times per month. On the other hand, in a case where the abnormality determination according to Example 1 was performed, the rate of failure to detect chatter marks decreased to 1 time per month.

From the result illustrated in Table 1, in Examples 1 and 2 including the principal component analysis step and the abnormal vibration detection step, an evaluation result of "chatter mark determination using vibration intensity" and an evaluation result of "visual chatter mark determination" matched. It is therefore unnecessary to determine whether or not abnormal vibration has occurred in a rolling mill by visual inspection of chatter marks after rolling of a metal strip unlike the conventional arts, and it is possible to determine whether or not abnormal vibration has occurred in a rolling mill online during operation of rolling equipment.

Example 2

Figure 6:
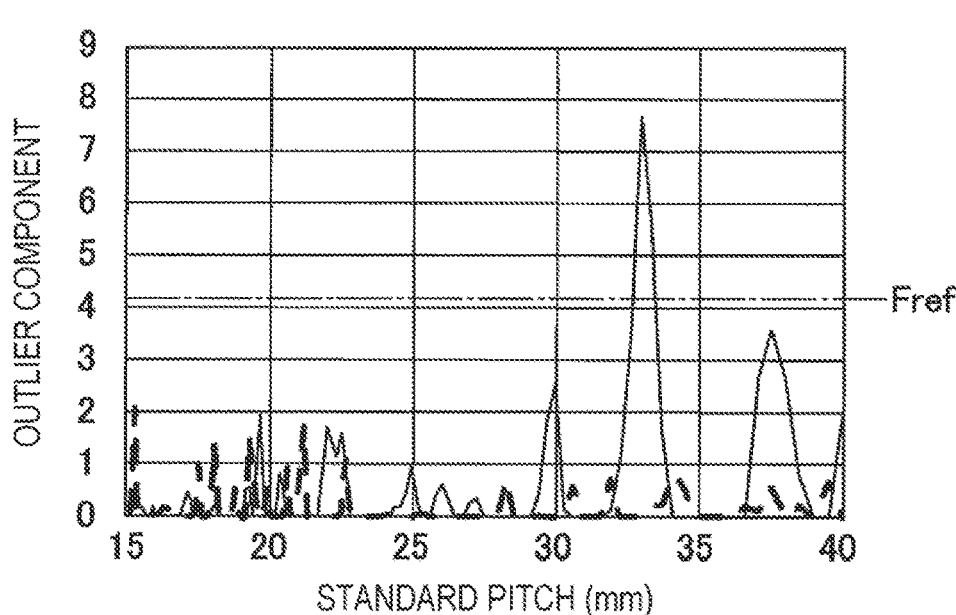
FIG. 6 is a graph of Example 3 illustrating outlier components at respective standard intervals.

Example 3 and Comparative Example 3 performed as Example 2 are described below. Target equipment in the present Example 2 was a tandem rolling mill with five stands, and a vibration meter was attached to a housing of each stand. A data collecting method etc. including setting of reference frequencies were similar to those in Example 1, and chatter marks occurred in a final stand (a fifth stand in this case) also in Example 2. Therefore, detection of an abnormality of the rolling mill was performed by using data of a vibration meter mounted on an operator-side housing of the fifth stand. In Comparative Example 3, chatter mark determination was attempted on vibration intensities at respective frequencies calculated from the vibration data of the vibration meter mounted on the operator-side housing of the fifth stand while changing a threshold value. Tables 2 shows a result. Note that "o", "x", and the parenthesis in Table 2 mean the same as Table 1.

the principal component deriving unit 16 calculated principal component vectors concerning the second reference vibration data as the second reference data. Then, second evaluation data concerning the second analysis data was calculated by using the second reference data as variables by principal component analysis performed by the principal component analysis unit 13. The abnormality detection unit 15 calculated a difference of the second analysis data from the second evaluation data as an outlier component. As illustrated in FIG. 6, abnormal vibration that caused chatter marks and normal vibration that did not cause chatter marks were clearly distinguished by the principal component analysis, and whether or not abnormal vibration that caused chatter marks occurred in the rolling mill could be determined with high accuracy by a set threshold value Fref. This shows that an appropriate threshold value can be set by calculating outlier components at respective standard intervals without identifying a frequency of vibration at which abnormal vibration occurs in advance.

Figure 7:
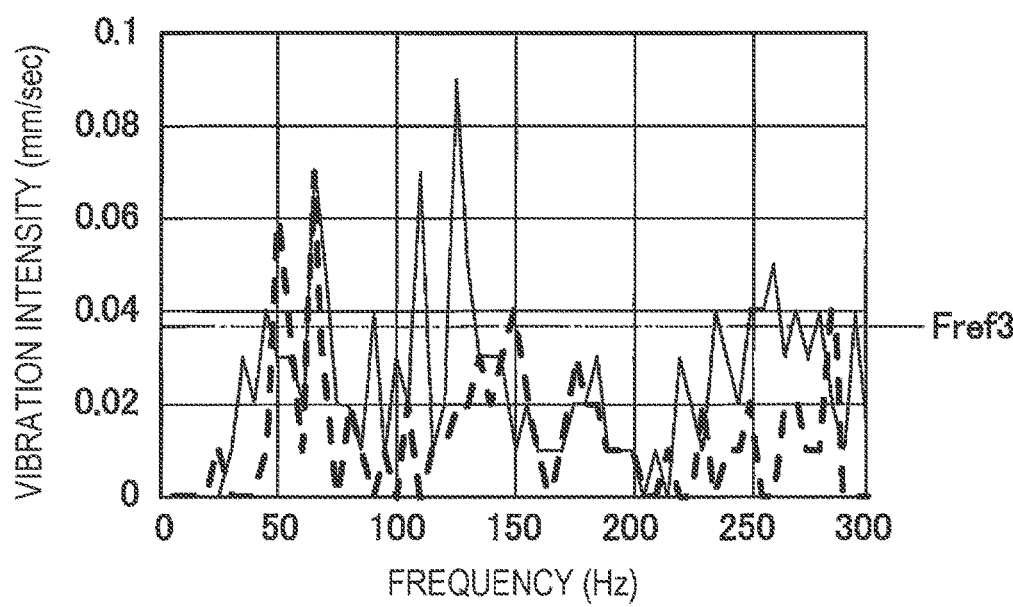
FIG. 7 is a graph illustrating Comparative Example 3 using a threshold value for vibration intensities.

FIG. 7 is a graph illustrating Comparative Example 3 using a threshold value for vibration intensities at respective frequencies. That is, FIG. 7 illustrates an example in which abnormality determination was performed by using first analysis data indicative of vibration intensities at respective frequencies output by the frequency analysis unit. Note, however, that FIG. 7 illustrates a frequency analysis result at a rolling speed of 14 m/sec since a peak position of the vibration intensities changes as a rolling speed changes. Comparative Example 3 is a result of determining whether or not chatter marks occurred by setting a threshold value Fref3 for the vibration intensities. As illustrated in FIG. 7, in a case where a specific frequency is set in advance and a threshold value is set only in a band of the frequency, there is a possibility that whether or not chatter marks has occurred can be determined, but it is difficult to perform such setting in advance, and actually, it is difficult to detect occurrence of chatter marks with high accuracy.

The disclosure is not intended to be limited to the above embodiment and can be changed in various ways. For example, although a case where the metal strip S is a cold-rolled steel sheet is illustrated in the embodiment, the metal strip S may be a stainless steel material or may be a

TABLE 2

| | Chatter mark determination using vibration intensity (o: did not occur, x: occurred) | Visual chatter mark determination (o: did not occur, x: occurred) | Result (o: matched, x: did not matched) |
|---|---|---|---|
| Comparative Example 3 (vibration intensity threshold value determination) | x (290 Hz) | o | x |
| Example 3 (outlier component threshold value determination) | x (33 mm) | x (33 mm) | o |

FIG. 6 is a graph of Example 3 illustrating outlier components at respective standard intervals. In Example 3, second reference data was derived by using second reference vibration data obtained by converting vibration intensities at respective frequencies collected from all speed ranges by the data conversion unit 14 by using, as reference vibration data, vibration data for one day measured after elapse of approximately one week from replacement of the backup rolls 5 into vibration intensities at respective standard intervals. That is, hot-rolled steel sheet instead of the cold rolled steel sheet. Furthermore, the rolling mills 2A, 2B, 2C, and 2D need not have an identical configuration, and may include, for example, both a four-high rolling mill and a six-high rolling mill.

The invention claimed is:

1. A method for detecting abnormal vibration of a rolling mill that has a pair of work rolls and a plurality of backup rolls that support the work rolls, the method comprising:

a collecting step of collecting vibration data of the rolling mill;

a frequency analysis step of generating first analysis data by performing frequency analysis of the vibration data;

a principal component analysis step of performing principal component analysis on the first analysis data by using reference data specified in advance on a basis of a normal state as a principal component and thereby generating evaluation data, which is a projection of the first analysis data onto the reference data; and an abnormal vibration detection step of extracting an outlier component from the evaluation data and the first analysis data and detecting an abnormality of the rolling mill from the extracted outlier component, wherein in the principal component analysis step, the principal component extracted as the reference data is set for each rolling speed in the rolling mill.

2. The method according to claim 1, wherein the frequency analysis step generates vibration intensities at respective frequencies as the first analysis data, the method further comprises a data conversion step of converting the first analysis data into second analysis data indicative of vibration intensities at respective intervals on a basis of a rolling speed, and the principal component analysis step performs principal component analysis of the second analysis data.

3. The method according to claim 1, wherein a plurality of principal components extracted as the reference data in the principal component analysis step are set so that a cumulative value of contribution ratios of the principal components becomes equal to or larger than a reference contribution ratio when principal component analysis is performed on normal analysis data acquired during rolling performed by the rolling mill in a normal state.

4. The method according to claim 1, wherein the rolling mill cold-rolls a metal strip.

5. A rolling method comprising a backup roll replacement step of, in a case where an abnormality of a rolling mill is detected by using the method according to claim 1, replacing the backup rolls of the rolling mill.

6. A method for producing a metal strip, the method comprising a step of producing a metal strip by using the rolling method according to claim 5.

7. The method according to claim 2, wherein a plurality of principal components extracted as the reference data in the principal component analysis step are set so that a cumulative value of contribution ratios of the principal components becomes equal to or larger than a reference contribution ratio when principal component analysis is performed on normal analysis data acquired during rolling performed by the rolling mill in a normal state.

8. A rolling method comprising a backup roll replacement step of, in a case where an abnormality of a rolling mill is detected by using the method according to claim 2, replacing the backup rolls of the rolling mill.

9. A method for producing a metal strip, the method comprising a step of producing a metal strip by using the rolling method according to claim 8.

10. An apparatus for detecting an abnormality of a rolling mill that has a pair of work rolls and a plurality of backup rolls that support the work rolls, the apparatus comprising:

a data collecting unit that collects vibration data of the rolling mill;

a frequency analysis unit that generates first analysis data by performing frequency analysis of the vibration data;

a principal component analysis unit that performs principal component analysis on the first analysis data by using reference data specified in advance on a basis of a normal state as a principal component and thereby generates evaluation data, which is a projection of the first analysis data onto the reference data; and an abnormality detection unit that extracts an outlier component from the evaluation data and the first analysis data and detects an abnormality of the rolling mill from the extracted outlier component, wherein the principal component extracted as the reference data by the principal component analysis unit is set for each rolling speed in the rolling mill.

* * * * *